(12) United States Patent
Stuart (10) Patent No.: US 10,828,801 B2
(45) Date of Patent: Nov. 10, 2020

(54) ADVANCED MICROFIBERS AND RELATED METHODS

(71) Applicant: Earnest Stuart, East Lansing, MI (US)

(72) Inventor: Earnest Stuart, East Lansing, MI (US)

(73) Assignee: RA ENERGY CORPORATION, Lansing, MI (US)

(*) Notice: Subject to any disclaimer, the term of this patent is extended or adjusted under 35 U.S.C. 154(b) by 68 days.

(21) Appl. No.: 15/579,303

(22) PCT Filed: Jun. 4, 2016

(86) PCT No.: PCT/US2016/035933
§ 371 (c)(1),
(2) Date: Dec. 4, 2017

(87) PCT Pub. No.: WO2016/197072
PCT Pub. Date: Dec. 8, 2016

(65) Prior Publication Data
US 2018/0215076 A1    Aug. 2, 2018

Related U.S. Application Data

(60) Provisional application No. 62/170,964, filed on Jun. 4, 2015, provisional application No. 62/268,060, filed on Dec. 16, 2015.

(51) Int. Cl.
*B29B 13/10* (2006.01)
*B29B 15/08* (2006.01)
(Continued)

(52) U.S. Cl.
CPC ............. *B29B 9/14* (2013.01); *C08J 3/124* (2013.01); *C08J 5/18* (2013.01); *C08L 101/16* (2013.01);
(Continued)

(58) Field of Classification Search
None
See application file for complete search history.

(56) References Cited

U.S. PATENT DOCUMENTS

2009/0036288 A1    2/2009 Hu et al.
2009/0171037 A1    7/2009 Aoshima et al.
(Continued)

FOREIGN PATENT DOCUMENTS

WO    2012/010401 A2    1/2012
WO    2013/163230 A2    10/2013
WO    WO-2015085168 A1 *    6/2015

*Primary Examiner* — Richard A Huhn
(74) *Attorney, Agent, or Firm* — Kagan Binder, PLLC (57) ABSTRACT

This invention provides a finely ground biomass material used to create biomass-containing plastics having a smooth surface, while also preventing creation of unwanted color including those created by the Maillard reaction which results from a combination of sugars, protein, heat and acid or base chemicals. The present invention also provides for methods to prevent agglomeration of small particles into larger particles which can produce irregular surfaces on biomass-based plastics, including thin film plastics, especially thin film plastics less than 4 mil and other thin film plastics that can become too large to use in thin-film plastic production. For the purpose of this invention, plastic resins can be any gas or liquid hydrocarbon or fermentation-based resins.

15 Claims, 4 Drawing Sheets

(51) Int. Cl.
    *C08L 97/02*     (2006.01)
    *C08L 99/00*     (2006.01)
    *B29B 9/14*     (2006.01)
    *G01N 15/02*     (2006.01)
    *C08L 101/16*     (2006.01)
    *C08J 3/12*     (2006.01)
    *C08J 5/18*     (2006.01)
    *A23K 10/37*     (2016.01)
    *C08J 5/04*     (2006.01)
    *A23P 30/00*     (2016.01)

(52) U.S. Cl.
    CPC ..... *G01N 15/0211* (2013.01); *G01N 15/0255* (2013.01); *A23K 10/37* (2016.05); *A23P 30/00* (2016.08); *B29B 13/10* (2013.01); *B29B 15/08* (2013.01); *C08J 5/045* (2013.01); *C08J 2397/02* (2013.01); *C08J 2400/16* (2013.01); *C08J 2467/02* (2013.01); *C08J 2467/04* (2013.01); *C08L 97/02* (2013.01); *C08L 99/00* (2013.01); *C08L 2203/16* (2013.01)

(56) References Cited

U.S. PATENT DOCUMENTS

| | | | |
|---|---|---|---|
| 2010/0281767 A1* | 11/2010 | Zeeck | C10L 5/44 44/589 |
| 2011/0039317 A1 | 2/2011 | Medoff | |
| 2012/0041081 A1* | 2/2012 | Hammond | A61K 8/97 514/783 |
| 2013/0104880 A1 | 5/2013 | Stuart | |
| 2013/0221140 A1 | 8/2013 | Boltersdorf | |

\* cited by examiner

ADVANCED MICROFIBERS AND RELATED METHODS

CROSS-REFERENCE TO RELATED APPLICATIONS

This application claims benefit from International Application No. PCT/US2016/035933, file Jun. 4, 2016, which in turn claims priority to U.S. Provisional Patent Application No. 62/170,964, filed Jun. 4, 2015, and to U.S. Provisional Patent Application No. 62/268,060, filed Dec. 16, 2015, the entire contents of which are incorporated herein by reference in their entirety.

FIELD OF THE INVENTION

The present invention relates to replacing hydrocarbon based and bio-based plastic resins with biomass microfibers. More specifically, the present invention relates to systems, methods, problem solving and products for creating biomass based plastic resin, including methods for achieving biomass-based microparticles suitable for use in thin film plastics

BACKGROUND

Small micron sized particles are valuable for a variety of purposes, including for use in thin film plastic snack bags, garbage bags, pet waste bags, specialty lumber products, molded plastic, chemical spill cleanup, animal litter and bedding.

Plastic compounders do not currently use non-hydrolyzed biomass derived microfibers in compounding for the production of thin film plastics, partly because the known art fails to provide methods to consistently obtain desirable final product specifications, nor to solve odor and color problems generated during plastic resin compounding and other process steps.

It is known in the art that as biomass is ground to smaller dimensions, agglomeration between the particles accelerates There is a need in the art for a practical, commercially viable biomass grinding, disagglomeration, dispersing and individual particle recovery method, and to prevent heat driven particle degradation Biomass derived microparticles may be used to replace gas and liquid hydrocarbon based or other plastic resins used in the production of thin film plastic products. One difficulty in using biomass in thin film plastics has been in producing native biomass at a longest dimension equal to or less than half the target thin film dimension, a challenge which includes preventing and/or reversing agglomeration of particles and maintaining target product dimension until compounded with resin.

Presently, most plastic resins and related products are derived from gas hydrocarbon, or to a much lesser degree, from liquid hydrocarbon derivatives. Compared to hydrocarbon sources, biodegradeable resins such as polyhydroxalkanoate (PLA), polybutylene succinate (PBS) and polyhydroxyalkanoates (PHAs) and their derivatives are produced in comparatively limited quantities from fermented sugars by way of select organisms, or, as with PHA, from biobased oils such as canola and greenhouse gases. Biodegradeable PHA plastic resins are also made by fermentation using gaseous renewable carbon based feedstocks.

The mechanical properties and biocompatibility of certain biodegradable resins, such as PHA, can also be changed by blending or modifying the surface, or combining the resin with other polymers, enzymes and inorganic materials.

As previously mentioned, thin film is used in snack food and other packaging. Bags containing crispy snacks such as potato chips, typically including an internal layer or layers consisting of 200 nanometers thick aluminum which is deposited as a vapor, when combined with bioadhesives and thin film bioresins, cools and bonds as a solid with plastic resin layers, serving as a moisture barrier useful for maintaining product crispness.

Odor and color management is a problem associated with the use of biomass for replacing plastic resin in food packaging. Biomass emits natural odors, ranging from mild, pleasant smells as with oat hulls, to extremely pungent odors as with mushroom bedding which contains poultry manure, mature mycelia and mushroom particles. The Maillard reaction creates new colors and odors in biomass based plastics resulting from combinations of protein, sugars, base or acid pH, moisture, heat, and time. Compounding biomass-resin formulae involves temperatures up to and exceeding 200 degrees Celsius, which drives the Maillard reaction to varying degrees depending on ratios of the inputs. Preventing the Maillard reaction, and destroying, reducing or masking native biomass odors is a challenge in plastic manufacturing. The Maillard reaction also creates a browning effect, which adds difficulty and expense when white or light colors are required for printing on bags.

Surface smoothness is important for thin film packaging. Achieving surface smoothness is challenging when compounding biomass particles into thin film plastic sheets to be made into snack bags.

Metal ball milling imparts a gray color which becomes even darker gray when exposed to resin compounding conditions, especially heat. An alternative grinding media solution to this color issue would be highly beneficial.

Grinding tests in the U.S. using stirred media ball mills can be done by companies such as Union Process using their "attritor" ball mills. However, problems exist in isolating targeted top particle size microfibers, because Union analytics do not reflect the actual size of particles leaving the ball mill systems. That applies to both the largest particle size and the percentages of all other microparticles.

The present invention seeks to overcome or improve upon some of the drawbacks associated with the prior art.

SUMMARY OF THE INVENTION

The present invention creates finely ground, diagglomerated biomass material for blending with plastic resins which are formed with at least one smooth surface, while also preventing the creation of unwanted color and odors, including those created by the Maillard reaction. The present invention reduces biomass to fine, agglomerated biomass microparticle groups, applies an analytical method to determine particle size scatter, achieves disagglomeration using air classification equipment based upon data from the analytical method and further refines the biomass microparticles according to the method to achieve specified top particle size before compounding with plastic resin. Within the present invention, any source of biomass microparticles can be used to create target sized microparticles suitable for compounding with plastic resin using the disagglomeration/classification method.

The final product produced by the methods of this invention may be further processed with optional additional grinding and agglomeration/air classification equipment to achieve a lower specified top size of target particle sizes, while particles not achieving target particle size may be further processed in achieving target particle sizes.

Optionally, one or more surfaces of the biomass-based microparticle plastic are made smooth. A first surface smoothness in thin film plastic may be achieved using cast film methods, which may optionally be employed for a second, or third surface. Smoothness may also be achieved by using a custom resin to fill in any surface irregularities caused by protruding particles. In one embodiment of the invention, a smooth surface is covered with aluminum vapors to create a solid, 200 nanometers vapor barrier towards the outer side of a plastic thin film sheet, in combination with other resin and adhesive layers.

In a further embodiment of the invention, approximately 300 micron D50 particle size microfibers are subjected to ball milling using ¼" ball mills consisting of ceramic media. Particles of any type of biomass and size can be brought into the present invention process.

The biomass material used in the systems and methods of the present invention may include oat hulls, wheat hulls, barley hulls or other forms of biomass, of any starting size, source or degree of prior processing.

The invention provides a method for producing finely ground biomass material. The method includes a number of steps. Dried biomass material is ground using a hammermill equipped with a screen having a hole pattern until all ground dried biomass particles have passed through the screen. The ground dried biomass particles are then ground with a grinder until less than a target percentage of the ground dried biomass particles have a particle size greater than a target particle size. The ground dried biomass particles are disagglomerated using an air classification system to separate fines, fines being particles having a size of less than a target fine size of no more than 16 microns, and oversized particles. The second grinding step using a grinder and the disagglomerating step are repeated on the remaining oversized particles until at least 80% of the ground dried biomass particles are below the target fine size. Grinding may alternatively be done until a different percentage of the ground dried biomass particles are below the target fine size, such as 20%, 30%, 40%, 50%, 60%, or 70%.

The second grinding step using a grinder may include a measurement sub-step including mixing the ground dried biomass particles with water or alcohol to form a mixture, determining the particle sizes by processing the mixture using a laser diffraction particle size analyzer, and, optionally, drying the mixture. The grinding and measurement sub-step are repeated until the target percentage of the ground dried biomass particles have a particle size less than the target particle size. The drying may be done using low pressure or vacuum drying in an oxygen-purged, inert gas environment.

The air classifying step may use surfactant assisted air classification.

The screen may have a 0.5 millimeter hole pattern.

The target percentage may be 2%.

The target fine size may be 10 microns.

The dried biomass material may be one or more of oat hulls, wheat hulls, rice hulls, barely hulls, hay, stalks, leaves, yard waste, miscanthus, and elephant grass.

The grinder may be a ball mill using ¼ inch grinding media consisting of ceramic material.

The second grinding step using a grinder and the disagglomerating step may be repeated on the remaining oversized particles until at least 80% of starch in the ground dried biomass particles is separated from the fines.

The fines may be compounded with a plastic resin to form a plastic film. At least 50% of material in the plastic film by weight may be the fines. The plastic resin may be a biodegradable plastic resin. The plastic resin may be one of polyhydroxalkanoate, polyhydroxyalkanoate, and polybutylene succinate. The plastic film may be a thin plastic film, and at least one surface of the thin plastic film may be covered with aluminum vapors to create an aluminum coating. The invention also provides a plastic film produced by these methods.

The invention also provides a method for producing finely ground biomass material using the following steps. Dried biomass material is ground using a hammermill equipped with a screen having a hole pattern until the ground dried biomass particles have an average particle size of less than 270 microns and a maximum particle size of less than 1000 microns. A portion of the ground dried biomass particles is then mixed with water or alcohol to form a first mixture. Another portion of the ground dried biomass particles is then mixed with water or alcohol to form a second mixture. The first mixture is then processed using a laser diffraction particle size analyzer to determine to determine a percentage of particles in the first mixture that are below a target upper particle size. The second mixture is processed using a sonicator to determine a percentage of sonication-disagglomerated particles that are below a target upper particle size. The first and second mixtures are then dried using low pressure or vacuum drying in an oxygen-purged, inert gas environment until the moisture content of the mixtures is reduced to less than 10%, and preferably less than 5%. The grinding, mixing, measurement, drying and grinding steps are repeated in sequence until at least 80% of the particles have a size of less than 16 microns. Alternatively these steps may be repeated until 20%, 30%, 40%, 50%, 60%, or 70% of the particles have a size of less than 16 microns. Alternatively these steps may be repeated until a certain percentage of the particles have a size less than 150 microns, 100 microns, 60 microns, 40 microns, or 10 microns, for example. The ground dried biomass particles are then air classified to separate fines, fines being particles having a size of less than a target fine size of 16 microns, and oversized particles. All the steps starting with the mixing step are then repeated on remaining oversized particles until at least 80% of the ground dried biomass particles are below the target fine size. The target upper particle size may be 16 microns.

The invention also provides a finely ground biomass material produced by any of the disclosed methods.

DETAILED DESCRIPTION OF THE INVENTION

Figure 1:
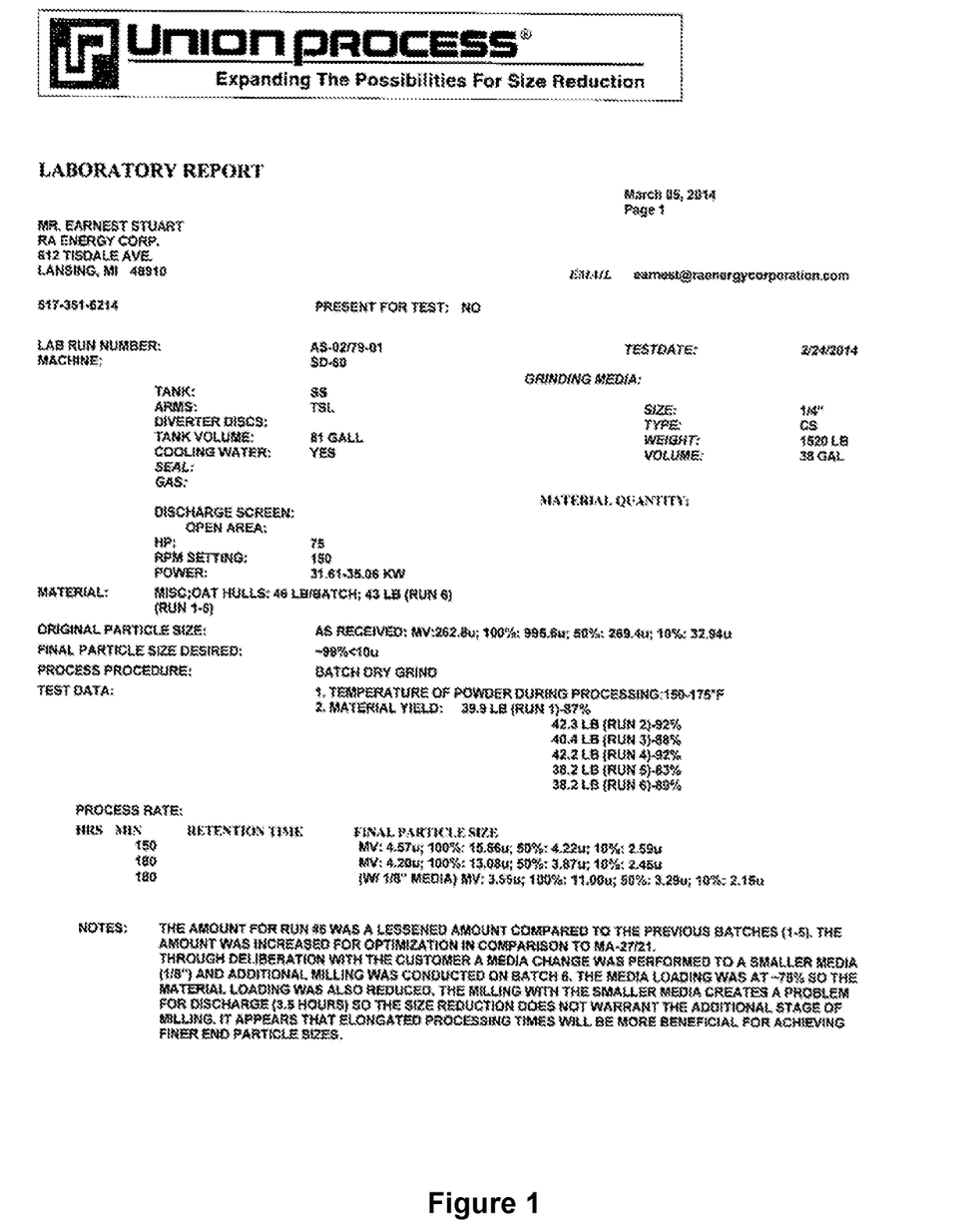
FIG. 1 is a laboratory report describing a sonicated lab run carried out according to yet another embodiment of the invention.
Figure 2:
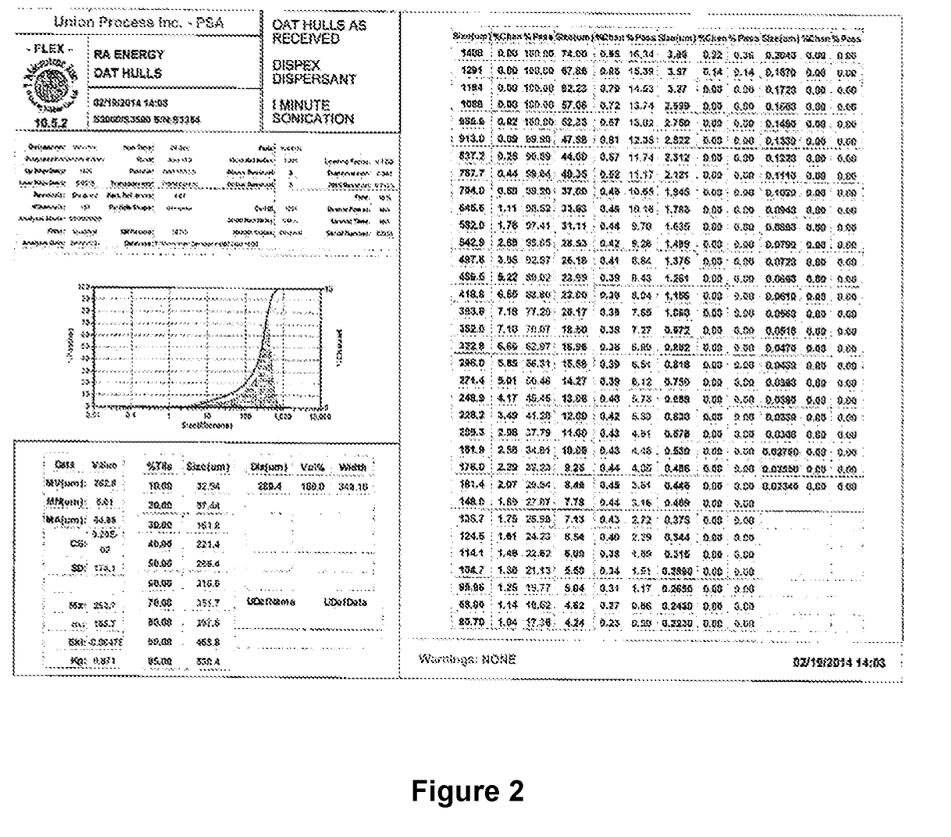
FIG. 2 is a lab report showing sonicated results according to a further embodiment of the invention.
Figure 3:
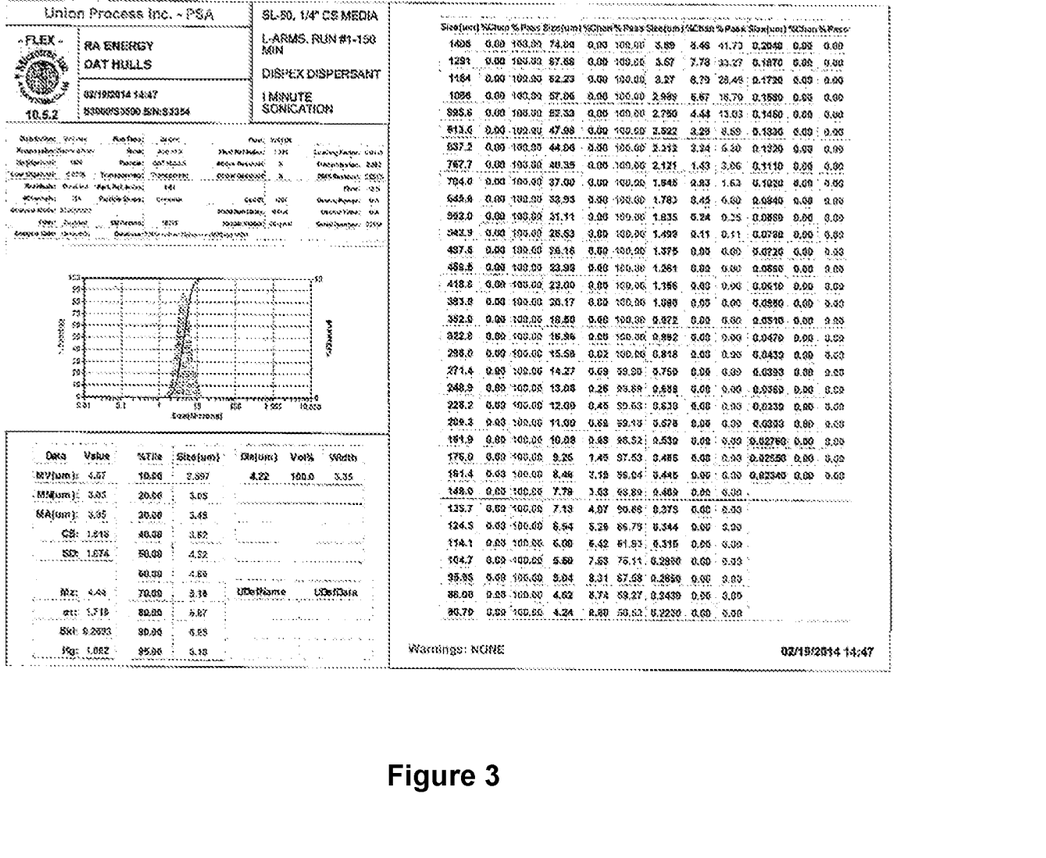
FIG. 3 is a lab report showing sonicated results according to a 150 minute, ¼" grinding media embodiment of the invention.
Figure 4:
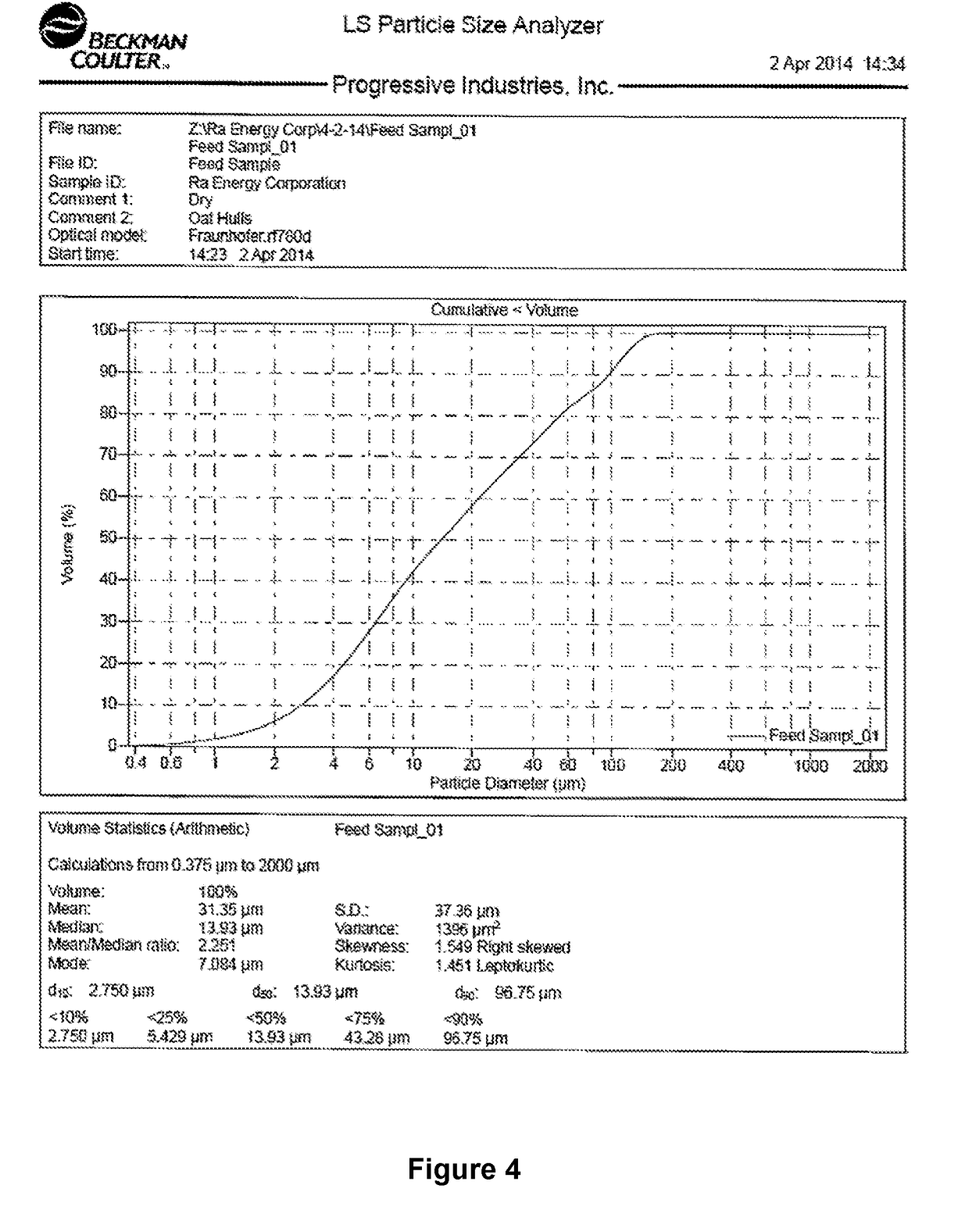
FIG. 4 is a progressive particle size analysis for intake material.

This invention provides systems and methods for the production of powdered microfiber biomass being less than 16 microns in maximum length. The powdered microfiber biomass is preferably less than 10 micron in maximum length, and even more preferably less than 7 microns in maximum length. The invention also provides an analytical method for predicting disagglomeration results, and related protocols for extracting targeted maximum length biomass microparticles from disagglomerated microparticle groups.

While protecting the biomass microparticles from chemical degradation and unwanted colors and odors imposed by the Maillard reaction, biomass microparticles are combined with one or more plastic resins from hydrocarbon or bio-based sources to create plastics including blown or cast thin film, to larger molded cast plastic products. Maillard reaction management is achieved through atmospheric control of oxygen by way of vacuum and/or purging with a Nobel gas, such as, without limitation, nitrogen or argon.

For the purposes of clarity, the following terms used throughout this document have the following meanings, unless the context of the use of such a term expressly or implicitly suggests a different meaning.

"Biomass" relates to any plant material in any form.

"Biomass microfibers" or "biomass microparticles" refer to biomass that is small relative to their native form.

"Fillers" are biomass fibers processed for compounding with plastic resins.

"Fines" are the portion of particles created during disagglomeration and air classification which have smaller upper and lower particle size as compared to pre-processed particles.

The related terms "coarse" and "oversized" refer to the portions of particles created during classification which have larger upper particle size as compared to the fines. "Oversized" fibers are biomass particles separated from "Fines", which are then used for a different market than the primary particle size use, or further refined with disagglomeration and classification, or are further fine ground in a ball mill, followed by disagglomeration and classification.

"Hull" (or "husk"), in general, is the outer shell or coating of a seed.

"Particle size", with reference to a biomass particle, means the length of the largest dimension of the particle. For example, if a particle is generally spherical, then the particle size is the diameter of the particle.

"Surfactant" or "Dispersant" are compounds that lower the surface tension (or interfacial tension) between two liquids, between a liquid and a solid, or between two solids.

"Air classifier" refers to a machine which typically separates materials by a combination of size, shape, and density. For the purpose of this invention, an air classifier first functions as a disagglomerator of bound biomass microfiber agglomerates.

"PLA" means polylactic acid, a type of biodegradeable plastic resin typically produced in pellet form.

"PBS" means polybutylene succinate, a biodegradable plastic typically produced for further processing in the form of pellets.

"PHA" means polyhydroxyalkanoate, a semi-crystalline thermoplastic polyester that is biodegradable in anaerobic and aerobic conditions.

"D50" refers to particle size distribution in which 50% of a sample's mass is smaller than the given D50 value, such that the D50 value represents the midpoint in the range of particle sizes in a given sample.

Any form of plastic resin described or referenced herein may be combined with any other type and sourced plastic resins, including combining hydrocarbon derived resins with bio-based resins. Any form of biomass can be processed with the present method and combined with any type of biomass and other filler.

Hammermilling:

The present invention first reduces native biomass, such as oat hulls, into smaller, agglomerated microparticles by hammermilling native biomass through screens with holes that are preferably 0.3 millimeters, or smaller, resulting in a D50 particle size of approximately 150-300 microns, in the case of oat hulls. Other types of biomass may require more or less processing for reaching similar, larger or smaller D50 and other sizes when ground. The upper particle size can range to approximately 1000 microns while the smallest particle size may be in the single digit micron size. Different hole sizes and shapes, motor speeds, other designs and other factors can result in larger top size, lower smallest size and size scatter differences than described here. Such differences do not fundamentally change downstream processing parameters and results, although different energy and equipment requirements may be required.

Hammermills, such as Mega Mill manufactured by Prater utilizes hammers swinging from a rotating shaft within a casing containing screens on its outer perimeter. The hammers cut, crush and grind particles until they can pass through a selected size screen. Alternately, a Fitzmill, or its equivalent, which employs sharp cutting blades, or another type of grinding machine may be used. Each of the types of machines above may be configured with screens containing openings that are preferably 0.3 mm or smaller, although larger sized screens may be used.

Alternatives to the Prater Mega Mill include burr mills and double disk attrition mills or any suitable grinding device. Ideal hammermill moisture content is less than 12%, under 10% and ideally, approximately 8%.

Any type of mechanical grinding device with similar properties to hammermills may be employed in the first stage of grinding native oat hulls or other form of biomass, as received from the sources.

Hammermilling oat hulls with a Prater Mega Mill was performed with the following configuration.

| Parameter | Value |
|---|---|
| Mill tip speed (Ft/Min) | 19,800 |
| Hammer quantity | 32 |
| Hammer thickness | ¼" |
| Rotor configuration | LONG |
| Screen size | 0.3 mm |
| Screen type | TRI |
| Screen open area | 6.4% |
| Total air | 785 CFM |
| Motor no load | 10.0 amps |
| Motor run load | 24.9 amps |
| Horsepower used in run | 19.9 hp |
| Feed amount | 38 pounds |
| Time fed | 10 minutes |
| Feed rate | 228 pounds/hour |
| HP capacity | 11.4 pounds/hour/hp |
| Screen area capacity | 0.5 pounds/hour/square inch |

Passing the oat hulls through the Prater Mega Mill resulted in the following distribution of particle sizes. The powder was passed through meshes of varying sizes to assess the particle size distribution.

| Screen size | | |
| --- | --- | --- |
| U.S. Mesh number | Sieve size (microns) | Amount retained |
| 40 | 425 | 2% |
| 100 | 150 | 66% |
| 160 | 75 | 78% |
| 325 | 45 | 83% |

Explosion and Fire Prevention and Maillard Reaction Prevention:

In one embodiment, first stage hammermill or equivalent grinding includes atmospheric control to purge oxygen to prevent fire and explosion. This can include vacuum and/or Nobel gas such as nitrogen or argon purging oxygen from the system. Hammermills or other grinding systems or other process equipment can be designed to support a sealed system vacuum and gas purging. The same sealed design can continue throughout the entire process of this invention of ultra fine ball milling, disagglomeration and classification, and can include equipment for compounding microfibers with plastic resin, and could include a blown or cast film, or molded stage in creating thin film or larger dimension molded plastic products. The same atmosphere control provides prevention of the Maillard reaction and its effects of malodors and unwanted colors.

Ball Milling.

Following grinding of raw biomass feedstock with hammermills or their equivalent, the next step in producing <16 micron sized biomass microparticles involves ultra fine grinding with ball mills.

Any type of ball mill, including vertical or horizontal ball mills may be a candidate for use in the present invention. Horizontal ball mills operate differently from vertical, stirred media mills and may be less preferred than the vertical mills due to their larger "headspace" and wave style ball movement and other factors. However, horizontal ball mills may be optionally used within the present invention where advantageous.

In a second stage of grinding to achieve agglomerated particle groups consisting of small micron sized individual particles <16 and <10 micron, an attritor ball mill is used to grind hammermilled biomass to below 16 microns as measured in laser diffraction particle size analysis as practiced at the attritor ball mill company which applies sonication/cavitation to disagglomerate resulting freshly ball milled particles into principally individual particles. Sonication/cavitation particle size analysis does not reveal actual particle size, while a high percent of the total particle sizes are above <16 and <10 microns.

When sonication/cavitation is not applied to samples before laser diffraction analysis, sample particle groups can range in size to above 150 microns, which is in fact their actual size. Especially aggressive agglomerations are formed by static charges on biomass during grinding due to extreme surface area, especially internal surface area, as well as by heat driven bonding to form glue like bonds, especially with grain based lignocellulosic hulls, such as oat, wheat, or barley hulls wherein starch and protein and other trace elements can cause agglomeration, sometimes irreversible, when heated and when processed at low moisture.

Ball mill grinding time can range from less than 1 hour to greater than 3 hours depending on top particle size strategy, smallest size particle interval or final timepoint extraction and specific biomass type. One disagglomeration and product isolation strategy can define timepoints for extracting target size microparticles from oversized microparticles, which may provide for multiple shorter grinding times combined in sequence followed by subsequent ball mill and/or disagglomeration treatment of oversized particles to achieve target size.

Extracting at intervals after partial disagglomeration and removing smallest target size particles created can make grinding more energy effective.

When necessary, common steel, stainless or chrome steel or other metal balls can be employed in ball milling. Larger or smaller ball media may be employed, including ¼" media worn into smaller spherical dimensions during grinding where the increasingly smaller media is optionally kept within the ball milling process until an appropriate target ball size is reached requiring ball removal through sieving.

Ball milling systems include those manufactured by Union Process of Akron, Ohio, called attritor mills, or similar but much larger mills built by Metso Corporation in Helsinki, Finland, both styled as "stirred media mills". Ball media, preferably ¼" ceramic, fill the vessel to near the top. The sweeping arms stir the ball media, grinding biomass fibers between the media, crushing the biomass fibers while the balls also rotate and move in different directions within the vessel.

Hammermilled oat hulls with moisture content of about 7.3% were processed with a Union Process SD-50 attritor for a period of about 150 minutes. In one run, the ball mill grinding tank was filled with stainless steel grinding media balls weighing 1516 pounds representing about 38/81 of the volume of the stainless steel tank. Horizontal arms attached to a vertical shaft move the stainless steel balls around the shaft at about 150 RPM. 34.2 pounds of oat hulls were added to the steel media balls in the process tank. The final processed powdered oat hull yield was about 33.1 pounds. The temperature of powder during processing was about 150-175° F. The processed oat hulls were separated by opening an exit valve while the mixing arms continued rotating, causing the fine powders to fall off the balls through the exit port. The attritor was operated with an actuated port on the bottom to allow microfiber powder to systematically exit the tank, and to separate microfiber powder from the media balls.

Upon completion of grinding 99.35% of the particles were measured to be less than 10 micron, while 90% were less than 7.02 micron, and 50% were less than 4.16 micron.

As previously discussed on the analytical aspect, sonication was applied to the laboratory process which reveals fully disagglomerated, individual particle sizes.

From the Union attritor mill, the biomass microparticle powder was recovered and tested for particle sizes using a laser diffraction analyzer, the S3500 manufactured by Microtrac Inc. Union Process' particle size analytical protocol is: mix biomass sample in water, add dispersant, sonicate the wet sample for 1-3+ minutes, and inject the wet sample into the Microtrac laser diffraction particle size analyzer. Results from the Microtrac reveals the smallest sized particle(s), the largest size particle(s) and a graph and chart showing the percentage of various particle sizes in intervals between the top and bottom particle size. A full report also shows product, product intake particle size, operational temperature(s), time, media, energy input, dispersant used in the lab sample setup, other inputs, and dates of operation. The report also includes particle size "D50" which represents a 50% data point revealing the particle size in the middle of the total range.

It is problematic that sonication/cavitation in the laboratory analysis provided by Union Process cannot be applied commercially in a dry biomass microfiber process, such as the present invention. Sonication/cavitation requires a liquid medium. An effective dry disagglomeration method was developed as practiced in the present invention.

Separating Ball Milled Microparticles:

At one end timepoint, or multiple, selected interval timepoints, media and biomass microfiber products are ejected from the stirred media ball mill vessel, followed by the ball media and biomass micro fibers being separated by screening. The next step isolates particles with top particle size conforming to a specific target, typically with its largest measurable dimension being at least half or smaller than the dimension of the targeted thin film plastic, an example being <12 or <7 microns for a 1 mil, 24 micron thick thin film plastic. Accurate measurement of the entire range of particle sizes derived from ball milling, including internal particle size groups within agglomerations, is critical to establishing a downstream processing protocol, including disagglomeration of large microparticle groups bound by multiple mechanisms, while the same analysis can feed back into grinding time and microparticle extraction sequencing from the stirred media mill stage.

Agglomeration and Disagglomeration:

As grinding progresses, agglomeration of ground microparticles increases the measured top, D50 and other interval particle size data numbers. At select product ejection timepoints from the stirred media ball mill, particles ejected before disagglomeration is applied will be highly agglomerated, up to 10 times or greater the target top particle size as measured with Union Process' sonication/cavitation based analytical method. Union Process disagglomerates ground microparticle samples for particle size analysis by placing a dry sample into water or alcohol, then sonicates the sample for 1-3+ minutes. A high degree of disagglomeration is achieved in the Union lab protocol for particle size analysis due to sonication/cavitation. By example, Union Process laboratory's analysis shows target top particle to be much lower than actual agglomerated particle size as measured by other methods. Specifically, Union's<10 micron particle size analysis using sonication/cavitation disagglomeration is shown to be, when not using liquid based sonication, 150 microns top particle size on oat hull microparticles. While sonication and its effect, cavitation, are applied for minutes, and often achieving nearly quantitative disagglomeration, achieving the same liquid based disagglomeration on a commercial scale is problematic due in no small part to energy requirements.

The present invention is a dry process while sonication/cavitation is applied to wet samples, and correspondingly would have to be applied to a wet commercial process. The average scatter of actual sized agglomerated particles compounded with resin can be greater than the top thickness dimension of the final thin film product of 1 or 2 mil, or 24 to 48 microns. To clarify, if the actual particle size, as a single particle or agglomerated particles, is greater than half the size of the targeted thin film thickness, particles will extend outside of the surface, which is not acceptable for marketing purposes for most plastics, especially in thin film food packaging.

Disagglomeration using an air classifier.

Ball milled biomass is processed with air classifier equipment to disagglomerate bound clumps of biomass microparticles and to remove individual particles called "fines" which have reached a target top particle size suitable for blending with select resins for producing specified products, ranging from thin film of less than 1 mil in thickness, to molded plastic products of any shape and size. A 1 mil, 24 micron thick thin film plastic sheet requires biomass microfibers no larger, and preferably much smaller than 10 microns at their longest dimension.

Oversized particles from the air classifier are optionally reintroduced into the attritor type ball mill for further grinding and subsequent disagglomeration and isolation in the air classifier to the specified top particle size, or are re-processed only by the air classifier for disagglomeration and classifying.

It was found through experimentation that, unexpected by the air classification vendor, agglomeration of bound microparticles from grinding and related heat and static can be reversed, and targeted upper particle size microfibers below 16 microns, and below 10 microns and below 8 microns can be isolated from portions and most of the ball milled microfibers during the method steps of this invention. It was found through failure, then success, that disagglomeration and extraction is effective in prescribed sequences of "cuts" during disagglomeration/extraction, meaning separation of percentages of approximately 50%-50% yield the highest percentage of target sized microparticles. When an air classifier is used as a disagglomerator, high percentages of target sized particles can be disagglomerated from other particles, providing a hybrid platform for disagglomeration and conventional classification in the isolation of microfibers at target sizes. Additional ball milling can optionally be applied in combination with further disagglomeration to achieve a high percentage of original biomass having reached target particle sizes.

It was shown that if disagglomerated, target sized microparticles are not compounded with plastic resin soon after disagglomeration, agglomeration can return. In such an instance, measured particle size increases up to 10 fold as during ball milling, and with more time, agglomeration was shown to become irreversible to a high degree. Many factors can cause agglomeration to return irreversibly, with heat being the apparent prime culprit, and in the case of oat hulls, trace starch and protein and moisture were likely contributors as well due to heat binding those elements together as a "glue". Some bio-based glues are made from protein.

In developing the present invention, heat in a pilot scale attritor mill hovered at about 170 F throughout grinding. This invention includes temperature control to reduce temperature to as low as freezing, preferably controlled to under 90 degrees F., as an agglomeration management strategy during fine milling for extended timeframes.

The custom designed air classifier-based protocol disagglomerates and separates ranges of particle size groups and a high percentage of the original batch effectively down to individual microfiber particle sizes in the target range of <16 micron, and <10 micron, and <7 micron. For example, in a first pass using an air disagglomerator/classification system with approximately 46%-54% cut of the fiber stream, a 150 micron top particle size as analyzed employing a non-sonicated lab sample method resulted in 46% of the total batch becoming <10 micron fines, as measured without sonication, representing actual particle size. The oversized portion from the same air classificatier system, was analyzed to have 50%<10 microns with a top particle size of 44 microns, down from 150 microns, indicating that disagglomeration of the entire batch took place to varying degrees in the air classifier.

Resin-Biomass Compounding

The present invention provides for a plastic film formed by compounding a plastic resin into pellets combined with the finely ground biomass material described herein. The plastic resin may be, for example, Polyhydroxalkanoate (PHA), polylactic acid (PLA), custom configurations of PLA, polybutylene succinate (PBS), or combinations of any of the above, optionally including a gas or liquid hydrocarbon-based plastic resin.

Fillers such as lime may also be included in compounding. At least 10% of the material forming the plastic film may be the finely ground biomass material. Preferably, at least 20% and up to 50% of the material forming the plastic film is the finely ground biomass microfiber material. In one strategy of disagglomerating and/or regrinding, particles with a top size of <7 and <5 can be achieved, which can be for specialty thin film plastic products. In one disagglomeration effort, 5% of the total microfibers run achieved a top particle size of <7 micron.

Target size microparticles are compounded with select resins, then processed into plastic products by blown or cast thin film, or cast and molded 3 dimensional plastic products.

Data shows compounding the microparticles with resin as soon possible after isolation from agglomeration provides an optimally effective compounding. Over time and under the wrong conditions of high temperature and humidity, if not compounded into resin quickly, <10 micron upper particle size microparticles will re-agglomerate to a point to where the air classifier will only disagglomerate 10% of such a batch.

Surfactants such as zinc stearate can be used in the disagglomeration step.

Oat Hull Microfiber Based Thin Film.

Oat hull microfibers from disagglomeration and separation were compounded with a custom resin based upon PHA. The ratio of microfibers to custom resin was 40%. A successful thin film sheet of plastic was produced through a die and blown film showing good stretch and strength characteristics without tearing.

Compounded fine particle, resin and additives in a new resin compound was further processed by blown film methods in which air or other gas expands the molten compound into thin film, which is cooled into tubes and cut into sheets;

Uses for blown thin film include snack packaging. Alternately, compounded microparticle-based resin pellets are heated and softened, then forced through a die which feeds a stretched sheet through dual rollers or over single rollers to impose at least one smooth surface on the cooled plastic, cast film sheet.

Odor Management.

The invention prevents, reduces or eliminates detectable odors, including those created by Maillard reactions. Maillard reactions result from combinations of sugars, protein, heat, and acidic or base pH, moisture and oxygen. Replacing or removing oxygen with vacuum and/or purging with Nobel gases such as nitrogen or argon, lowers or eliminates the effects of oxygen in high temperature steps, including ball milling, drying and compounding, individually or as a sequence. In some steps, moisture may remain while oxygen purge still prohibits the Maillard reaction.

The present invention reduces, neutralizes or masks emissions of native odors produced by oat hulls, or other biomass, which otherwise emit in the form of a mild sweet odor, or in the case of Maillard reactions, sweet, slightly or strong burned odors. Some final products may not require odor control;

Vapor Barrier:

An additional layer of vapor deposited aluminum towards the outside layers of thin film packaging or other film products to augment the thin film deposited aluminum typically used in inner layers towards products, is employed to contain native and other odors emanating outwardly from biomass microparticles; aluminum films are typically deposited in 200 nanometer thickness on interior layers of snack bags and other food packaging for vapor barriers;

Retaining Native Oat Hull Color Using Ceramic Media.

In order to maintain the native color of certain biomass, an example being "blonde" oat hulls, ceramic media (balls) were tested and found to not impart the gray color on oat hull biomass microfibers, as can be the case when using steel ball media (common, stainless, chrome).

Energy Reduction.

Ground biomass microparticles of target size <16 micron, <10 micron and <7 micron from ball milling can be disagglomerated and isolated with air classifier equipment to break agglomerations and to separate particle size classes in order to minimize the energy consuming effect of smaller particles on the grinding of larger particles. This reduces energy, capital, labor and other costs for fine grinding. In such an embodiment of this invention, each class may be further ground, then classified to achieve target size, with oversized particles of different batch sizes being further ground and/or further disagglomerated. During the grinding, disagglomeration and classification steps, finer particles can be re-blended for final, similar size particle grinding efficiency.

Analytical Protocol.

Sonication creates cavitation bubbles which aggressively overpower all but the most aggressive biomass microparticle agglomeration bonds in wet laboratory samples prepared for laser diffraction particle size analysis. Such a step dissociates and isolates individual particles suspended in liquid. Sonication and its related effect, cavitation, is only possible in a liquid medium. Sonication/cavitation disagglomerated samples are injected into a laser diffraction particle size analyzer. The result in a sonication/cavitation analysis showing particle size data much smaller than actual top particle size and overall particle size scatter as measured by other wet and dry methods for microfiber samples exiting the stirred media ball mills at Union Process in Akron, Ohio. Alternative wet laser diffraction analytical processes do not use sonication/cavitation, with cavitation representing a process step not possible in a dry commercial disagglomeration process step, as with the present invention. The sonication/cavitation based particle size analysis predicts the potential lowest top particle size which can be extracted from agglomerations due to the extreme energy input of cavitation onto small lab sized particle samples, but not the method and protocol for achieving disagglomeration and target particle isolation in a commercial dry grinding process. Non-sonicated/cavitated particle size analysis, in combination with the sonicated/cavitated analytical method creates a map for defining disagglomeration method parameters adequate for isolating a high percentage of particles with a top particle size below targeted size.

The present invention includes an analytical method for providing accurate particle size data at all stages of the present invented process, and provides a hybrid predictive method for determining actual and potential particle sizes achievable throughout the grinding and disagglomeration steps towards final top product size of <16 microns, or smaller.

HLDM.

The combined laser diffraction is called HLDM (Hybrid Laser Diffraction Method). Other types of analysis can be performed to augment the method of this invention, including electron microscopy, and combinations of laser diffraction and electron microscopy, with the key being the combination of using separate analytical methods to achieve an actual particle size mapping and predictable result formula to compare agglomerated samples with internal subsets which can be reduced to target size, and be isolated from larger particles. Use of the protocol can be in stages of disagglomeration, separation of target and oversized microparticles, and extraction of target size microparticles for optimal effectiveness and energy efficiency.

The following protocols may be used, together or separately, in certain embodiments of this invention:

a) Component Dry Subsample Method (1): Analyze dry sample by mixing dry microparticles in water or alcohol, optionally adding a surfactant, then process the wet sample in any laser diffraction particle size analyzer, including an S3500 such as manufactured by Microtrac Inc. (Montgomeryville, Pa. USA) for top particle size and percentage scatter of other size particles. Do not sonicate sample 1, which would artificially disagglomerate agglomerated particles and change the particle analysis results to a false lower size profile from a commercial point of view. Inject sample into laser diffraction analyzer as described above. Record data.

b) Component Dry Subsample Method (2): Separately analyze a dry sample from the main sample as above mixed in water or alcohol and optionally, surfactant/dispersant; add sonication for 1-10 minutes using any appropriate sonicator, including a QSonica Q800R1. Inject sample into the laser diffraction analyzer as described above to determine top particle size and percentage of other particle sizes of sonication-disagglomerated particles. Record data.

c) Compare and analyze the sonicated and non sonicated microparticle data. The sonicated sample reveals the potential of disagglomerated air classified particles which can be disagglomerated and separated in one or more downstream steps using air classifier equipment such as manufactured by RSG, Inc. in Sylacauga, Ala., while the non-sonicated sample reveals the actual upper particle size and spread of agglomerated particle sizes within the sample including those already at target size. Generally, the percentage of target sized particles the non-sonicated test reveals, represents the approximate "cut" of Fines and Oversized particle groups. If the sonicated analysis does not reveal a large percentage at target particle size, for example, 10-20%, additional grinding in the stirred media mill is required. Tuning these aspects until the percentage of target particles is recorded, then run the cut according to that percentage split.

In developing the present invention, sonication-based oat hull grinding data showing 99.4%<10 microns, is combined with non-sonicated sample production and analysis, which shows the actual top particle size of approximately 150 microns. In developing the present method, stirred media ball milling without interval extractions required 150 minutes to achieve a sonicated base analysis of the 99.4%<10 microns. At 1 hour, a sonicated testing showed <74 micron achieved, which allows for extraction of target sized particles combined with a regrind and/or disagglomeration and classification. Combining all results, an efficient method to create <16, <10 and <8 micron sized particles is demonstrated. Once optimized, total effective grinding time is reduced in reaching target particle size.

Finely ground particles as described above are separated without and with surfactant assisted disagglomeration using air classifying equipment, while simultaneously air classification and microfiber separation involving rates of classifier circulation, system size and other parameters to create "splits" of target size, preferably to less than 16 microns, and oversized particles, wherein oversized particles are further classified to target particle size until at least 40%, 50%, or 80% 90% or 100% of original material is below the target size.

Optionally, molten resin is mixed with biomass microfibers and pumped through a slurry mixer such as a Supraton manufactured by BWS in Grevenbroich, Germany, to disagglomerate and blend all fillers and resin. The compounded plastic is then cooled and forced through a die and formed into pellets, then remelted and pressed through a die for thin sheets, filaments, strings or small individual plastic compound particles and larger molded plastic products. Optionally, the above described ball mill based disagglomeration is combined with a slurry mixer in sequence, repeated as necessary, with traditional compounding systems.

In another embodiment of the present invention, the step wherein the biomass-derived fibers are ground by a ball milling, roller milling or equivalent mechanical grinding process occurs in a cooled grinding chamber, or in freeze drying or cryogenic chamber, followed by disagglomeration and classification as described herein.

Methods of this invention will generally result in 10%, 20%, 30%, 40%, 50% or 60% biomass microfibers in thin film blown film and cast film products. With the exception of possible trace percentages of the biomass microfibers being converted into sugars or chemicals from sugars, the microfibers are generally non-hydrolyzed.

Moisture content in all dry grinding steps is maintained at less than 12%, between 1% and 10%. Moisture content in compounding is <1%.

For the purposes of atmosphere management for safety and preventing Maillard reactions, inert gases such as nitrogen, argon, etc. may be used throughout the process, or in individual stages. Alternatively, vacuum atmosphere conditions may be used, such as in a Littleford Technifax vacuum drying process.

In yet another embodiment of the present invention, the processed particles are coated with plastic resin vapors which condense upon the surface of the particles. One stage can include resin vapor deposition during resin manufacturing.

In one embodiment, micro particles of Magnesium Oxide (MgO), Zinc Oxide (ZnO), and/or Titanium Dioxide (Tio2), and/or a surfactant/dispersant are applied through condensation of vapors from a chosen resin in which is introduced at a vapor temperature for the resin, then cooled in a staged movement of a continuous process, or in a batch process wherein the batch vessel is cooled to the condensation temperature of the resin.

A person skilled in the art will understand that ionization and deionization methods may be applied throughout the method steps of this invention to neutralize agglomeration-causing static.

The feedstock material may be any kind of natural fiber biomass including grain hulls, hay, stalks, leaves, yard waste, high-production biomass such as miscanthus, and elephant grass. Biomass microparticles from any process can be used within the present invention to disagglomerate and isolate target sized microparticles for plastic compounding.

Combinations of any type of plastic resins described herein can be utilized within the scope of the invention.

Disagglomeration and air classification of ground particles may be applied in association with the grinding or hammermilling stage, which provides for the reduction of starch and protein and creates a platform for particle size grouping to enhance subsequent ball milling.

Example Process.

In certain embodiments of the invention, the method includes one or more of the following steps:
- a) the dried biomass material is first ground using a hammermill equipped with a screen having a 0.5, 0.3 millimeter or smaller hole pattern until all the ground dried biomass particles have passed through the screen;
- b) the hammermilled dried biomass particles are then ground with a ball mill or similar acting mechanical device until less than 2% of the particles have a particle size greater than 16 microns;
- c) compounding the ground dried biomass particles with plastic resin to form plastic pellets followed by blown-film or casting methods;
- d) after the step of grinding the hammermilled dried biomass particles with a ball mill or similar acting mechanical device, forming a slurry by adding alcohol to the ground material;
- e) processing the slurry using a high shear and/or a cavitation device, or a high speed IsaMill, a type of high speed media mill;
- f) maintaining ethanol below 40%,
- g) optionally maintaining ethanol below 30%;
- h) optionally maintaining ethanol below 20%
- i) mechanically pressing ethanol from microparticles
- j) drying the microfibers still containing ethanol until completely dried of ethanol;
- k) compounding the dried material with plastic resin to form a plastic film; and
- l) forming a plastic film by compounding a plastic resin with the finely ground biomass material, wherein at least 10-60% of the material forming the plastic film is the finely ground biomass material.

Example Process
- a) Size a sample of biomass by mechanical grinding, such as hammermilling, to an average particle size of approximately 270 microns and an approximate upper particle size of 1000 microns;
- b) determine particle size;
- c) analyze dry samples by mixing the sample with water, then process the wet sample in a laser diffraction particle size analyzer, wherein the sample is not sonicated;
- d) fine mill the hammermilled particles using a stirred media attritor or horizontal ball mill for approximately 150 minutes to create finer particles from the ones described above in (a) until the non-sonicated upper particle size is analyzed to be approximately 150 microns employing the laser diffraction analytical method described in (c) above;
- e) disagglomerate fine particles using an air classifier and separate approximately 46% of the finely ground particles to <16 microns top particle size ("Fines #1") and approximately 56%>16 microns ("Coarse #1"); and
- f) further disagglomerate and air classify the Coarse #1 batch until approximately 50% of those particles has reached <16 microns (Fines #2) and approximately 50% is >16 microns (Coarse #2).
- g) further air classify Coarse #2 into <16 micron (Fines #3) and >16 microns (Coarse #3).
- h) repeat steps (b)-(h) until at least 75% of the original hammermilled hulls are <16 microns as measured with the analytical method and equipment described in this embodiment of the invention.
- i) dry the reduced size hulls to less than 1% moisture using vacuum and heat, in a minimal oxygen, inert gas environment, using, for example, the Littleford Technifax™ vacuum drying process;
- j) wherein disagglomeration using an air classification system and particle separation is repeated until at least 50%, 80%, 90% or 100% of particles have a particle size of approximately <16 microns, <10 microns, or <5 microns;
- k) wherein <16 micron particles are compounded with plastic resins to create blown thin film or cast thin film, or cast 3 dimensional plastic products Example Process—Core Process+Detailed Analytical—Lignocellulosic Biomass
- a) Size a sample of lignocellulosic biomass by mechanical grinding, such as hammermilling, to an average particle size of approximately 270 microns and to an approximate upper particle size of 1000 microns;
- b) fine mill the hammermilled particles using a ball mill or attritor mill for about 150 minutes to create finer particles from the ones described above in (a);
- c) Use one of the following particle size analysis methods in the following steps: Sample Method (1): Analyze dry sample by mixing in water or alcohol, then process the wet sample in a laser diffraction particle size analyzer S3500 such as manufactured by Microtrac Inc. Do not sonicate the sample. Sample method (2): Separately analyze another dry sample as above mixed in water or alcohol, but add sonication for 1-3 minutes using a sonicator such as a QSonica Q800R1. Analyze particle size as described above in the sonicated sample to determine what percentage of sonication-disagglomerated particles is shown to be <16 microns, and analyze the non-sonicated data to determine actual upper particle size and percentage of <16 micron showing within the total particle scatter. The sonicated sample reveals the potential for disagglomeration air classification equipment which can be classified and separated in one or more downstream air classifications, while the non-sonicated sample reveals the actual upper particle size and spread of agglomerated particle sizes within the sample. The combined laser diffraction method described herein is called DLDM (Dual Laser Diffraction Method);
- d) analyze the new finer-size particle sample for upper particle size, and the percentage of <16 micron particles within the overall scatter of particle sizes as described in (c) above using the non-sonicated DLDM portion of the method described herein, and analyze the percentage of <16 micron particles in the sonicated sample. The target upper particle size in the sonicated sample is preferably <16 microns, and the upper target sized particle in the non-sonicated sample is preferably 150 microns;
- e) Disagglomerate and air classify the fine particles described above and separate the Fine milled particles from the Oversized particles, separating approximately 46% of the finely ground particles to <16 microns top particle size ("Fines #1") and 54%>16 microns ("Coarse #1");
- f) Analyze both samples using the DLDM dual method as described in (c) above;
- g) Further air classify the Coarse #1 batch until 46% of the particles has reached <16 microns (Fines #2) and 65% is >16 microns (Coarse #2). Further air classify Coarse #2 into <16 micron (Fines #3) and >16 microns (Coarse

3). Repeat until at least 75% of the original hammer-milled hulls are <16 microns;
h) Analyze samples using the DLDM.
i) dry the reduced size hulls to less than 1% moisture using vacuum and heat, in a minimal oxygen, inert gas environment, using, for example, a customized Littleford Technifax vacuum drying process;
j) wherein disagglomeration using an air classification system and particle separation is repeated until at least 50%, 80%, 90% or 100% of particles have a particle size of approximately <16 microns, <10 microns, or <5 microns;
k) wherein target sized particles are dried using low pressure or vacuum drying in an oxygen-purged, inert gas environment until the moisture content of the mixtures is reduced to less than 10%, preferably to less than 1% moisture;
l) and wherein target sized particles are compounded with plastic resin Example Process—Lignocellulosic Biomass—Top Cut Below 10 Micron Using substantially the same method described above, optionally add the following method steps:
a) blend a surfactant such as stearic acid at 2% by weight to microfibers in a drum mixer;
b) further disagglomerate and air classify <16 micron microfibers to a target of <9; and
c) for specific product use, air classify to smaller sizes including <8, <7, <6 and <5 micron Fines in a tuned RPM air classifier. Further classify the Coarse from any of the above classifications until 80% of the original particles from previous classifications have reached one of the top particle sizes described above.

Example Process—10 Micron and Plastic Resins—Lignocellulosic Biomass

Using substantially the same method steps described in the examples above, optionally add the following method steps:
a) in all grinding and classifying described above, analyze particle samples for upper particle size using the DLDM method;
b) compound gas or liquid hydrocarbon-derived resins, or PLA or PHS biodegradeable resins, and optionally additional surfactant up to 2%, calcium carbonate up to 40%, colorizers up to 7%, and <10 micron sized particles from 10-50% by weight relative to final resin compound product, in an air/oxygen purged twin or single screw extruder; add nitrogen or other inert gas; extrude, cool and pelletize the new resin compound; and
a) In an air/oxygen purged atmosphere, melt and extrude the new resin compound through a die designed to create 1-2 mil thin film plastic sheets by blown film or cast film, providing at least one smooth surface, then cool the sheets for further processing.
b) In an air/oxygen purged atmosphere, melt and extrude the new resin compound through a die designed to create cast 3 dimensional products of any size, then cool the cast product sheets A person skilled in the art will understand that the specific method steps employed to achieve the present invention may include a combination of the method steps described above, and the order in which the method steps appear during the process may vary.

While certain embodiments described herein generally refer to oat hulls or lignocellulosic biomass by way of example, the invention is not limited to finely ground oat hull material or specific lignocellulosic biomass. As will be appreciated by skilled persons, the methods described herein can be used to produce finely ground versions of various dried biomass materials, such as hulls of wheat, corn, wheat, rice, beans and various seeds, aquatic plants and any form of specially grown lignocellulosic biomass. Any form of biomass, including energy crops, seed hulls, corn stalks and stems, grain crop stems, aquatic plants and any other form of biomass may be processed with the same objectives in a manner similar to oat hulls, as will be understood by a skilled artisan.

Although it is preferred that, for example, 99% or more of the material has a particle size of less than 16 microns, embodiments where, for example, 98%, 99% or 80%, or 50% or 40% of the material has a particle size of less than 16 microns are also within the scope of the invention, as are embodiments where 98% or 99% or 80% or 50% of the material has a particle size of less than 15 microns or less than 13 microns or less than 10 microns or less than 6 microns. When specified target particle size is reached for fulfilling a particular plastic dimension requirement, e.g. 2 mil or 1 mil, lower percentages of the total original biomass which reach target biomass particle size, such as 50%, is also within the scope of the invention. Alternative uses for "oversized" particles may then determined, or oversized particles may be further processed to reach <16 microns.

A skilled person will understand that blown-film and cast film methods, as used throughout this document, refers to known processes.

One of the most common methods of film manufacture is Blown Film (also referred to as the Tubular Film) Extrusion. The process involves extrusion of a plastic through a circular die, followed by "bubble-like" expansion. The principal advantages of manufacturing film by this process include the ability to:

Produce tubing (both flat and gusseted) in a single operation, regulation of film width and thickness by control of the volume of air in the bubble, the output of the extruder and the speed of the haul-off, eliminate end effects such as edge bead trim and non uniform temperature that can result from flat die film extrusion, capability of biaxial orientation (allowing uniformity of mechanical properties), blown film extrusion can be used for the manufacture of co extruder, multiplayer films for high barrier applications such as food packaging.

The Cast film process involves the extrusion of polymers melted through a slot or flat die to form a thin, molten sheet or film. This film is "pinned" to the surface of a chill roll (typically water-cooled and chrome-plated) by a blast of air from an air knife or vacuum box.

Mold Cast plastics can be produced using the various particle size microfibers described herein;

It should be understood that the above-described embodiments of the present invention, particularly, any "preferred" or "optional" embodiments, are only examples of implementations, merely set forth for a clear understanding of the principles of the invention. Many variations and modifications may be made to the above-described embodiment(s) of the invention as will be evident to those skilled in the art.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

Where, in this document, including the claims, the conjunction "or" is used in a list, such as in "w is done by performing x, performing y or by performing z", unless otherwise clearly implied, the "or" is non-exclusive. In this example, w may therefore be done by performing all of x, y and z, performing any two of x, y and z, or performing any one of x, y and z, unless the simultaneous performance is not possible or does not make sense.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description as a whole.

In developing an alternative to the dry process of the present invention, it was found that use of alcohol provides a lower volume rheology than a water-based wet disagglomeration and particle size reduction process. While water based methods for processing microfibers is difficult due to the low microfiber solids loadings required for pumping, ethanol-biomass microparticle rheology allows for pumping with much lower ratio of ethanol to microfibers, thus providing a practical pumping and processing capacity.

What is claimed is:

1. A method for producing finely ground biomass material, the method comprising the steps of:
    (a) providing dried biomass material;
    (b) grinding the dried biomass material using a hammermill equipped with a screen having a hole pattern until all ground dried biomass particles have passed through the screen;
    (c) grinding the ground dried biomass particles with a grinder until less than a target percentage of the ground dried biomass particles have a particle size greater than a target particle size;
    (d) disagglomerating the ground dried biomass particles using an air classification system to create and separate fines, fines being particles having a size of less than a target fine size of no more than 16 microns, and oversized particles; and
    (e) repeating steps (c) and (d) on the remaining oversized particles until at least 50% of the ground dried biomass particles are below the target fine size.

2. A method for producing finely ground biomass material, the method comprising the steps of:
    (a) providing dried biomass material;
    (b) grinding the dried biomass material using a hammermill equipped with a screen having a hole pattern until the ground dried biomass particles have an average particle size of less than approximately 270 microns and an approximate maximum particle size of less than approximately 1000 microns;
    (c) grinding the ground dried biomass particles with a grinder until less than a target percentage of the ground dried biomass particles have a particle size greater than a target particle size;
    (d) mixing a portion of the ground dried biomass particles with water or alcohol to form a first mixture;
    (e) mixing another portion of the ground dried biomass particles with water or alcohol to form a second mixture;
    (f) processing the first mixture using a laser diffraction particle size analyzer to determine to determine a percentage of particles in the first mixture that are below a target upper particle size;
    (g) processing the second mixture using a sonicator to determine a percentage of sonication-disagglomerated particles that are below a target upper particle size;
    (h) disagglomerating and air classifying the ground dried biomass particles to separate fines, fines being particles having a size of less than a target fine size of 16 microns, and oversized particles;
    (i) repeating steps (c) to (h) on remaining oversized particles until at least 50% of the ground dried biomass particles are below the target fine size; and
    (j) drying the first and second mixtures using low pressure or vacuum drying in an oxygen-purged, inert gas environment until the moisture content of the mixtures is reduced to less than 10%.

3. The method of claim 1, wherein the air classifying step uses surfactant assisted air classification.

4. The method of claim 1, wherein the screen has a 0.3 millimeter hole pattern.

5. The method of claim 1, wherein the target percentage is 2%.

6. The method of claim 1, wherein the target upper fine particle size is 10 microns.

7. The method of claim 4, wherein the target upper particle size is 16 microns.

8. The method of claim 1 wherein the dried biomass material is any one selected from the group consisting of oat hulls, wheat hulls, rice hulls, barely hulls, hay, stalks, leaves, yard waste, miscanthus, and elephant grass.

9. The method of claim 1 wherein the grinder is a ball mill using ¼ inch grinding media consisting of ceramic material.

10. The method of claim 1 wherein the fines are compounded with a plastic resin to form a plastic film.

11. The method of claim 10 wherein at least 50% of material in the plastic film by weight is the fines.

12. The method of claim 10 wherein the plastic resin is a biodegradable plastic resin.

13. The method of claim 10 wherein the plastic resin is derived from hydrocarbon.

14. The method of claim 10 wherein the plastic resin is selected from the group consisting of polyhydroxalkanoate, polyhydroxyalkanoate, and polybutylene succinate.

15. The method of claim 10 wherein a 200 nanometer deposited aluminum layer is placed within the outer packaging surface group.

* * * * *